US006569318B2

(12) United States Patent
Harle et al.

(10) Patent No.: US 6,569,318 B2
(45) Date of Patent: May 27, 2003

(54) PROCESS FOR CONVERSION OF HYDROCARBONS ON A CATALYST WITH CONTROLLED ACIDITY

(75) Inventors: Virginie Harle, Lamorlaye (FR); Stéphane Kressmann, Serezin du Rhone (FR); Isabelle Guibard, Saint Symphorien d'Ozon (FR); Slavik Kasztelan, Rueil-Malmaison (FR); Frédéric Morel, Francheville (FR)

(73) Assignee: Institut Francais du Petrole (FR)

( * ) Notice: Subject to any disclaimer, the term of this patent is extended or adjusted under 35 U.S.C. 154(b) by 56 days.

(21) Appl. No.: 09/790,873

(22) Filed: Feb. 23, 2001

(65) Prior Publication Data

US 2001/0023840 A1 Sep. 27, 2001

Related U.S. Application Data

(60) Provisional application No. 60/186,300, filed on Mar. 1, 2000.

(30) Foreign Application Priority Data

Feb. 23, 2000  (FR) ............................................ 00 02284

(51) Int. Cl.[7] ........................ C10G 65/02; C10G 45/04

(52) U.S. Cl. .................. 208/210; 208/213; 208/216 R; 208/217; 208/251 H; 208/254 H; 208/108; 585/259; 585/260; 585/265; 585/274; 585/276

(58) Field of Search .................................. 208/210, 213, 208/216 R, 217, 251 H, 254 H, 108; 585/259, 260, 265, 274, 276

(56) References Cited

U.S. PATENT DOCUMENTS 4,309,278 A * 1/1982 Sawyer .................... 208/111.3
4,511,458 A * 4/1985 Billon et al. ................ 208/210

FOREIGN PATENT DOCUMENTS

EP  0 743 351 A2  11/1996
EP  0 848 992 A1  6/1998

* cited by examiner

Primary Examiner—Walter D. Griffin
(74) Attorney, Agent, or Firm—Millen, White, Zelano & Branigan, P.C.

(57) ABSTRACT

The invention relates to a process for conversion of hydrocarbons in the presence of at least one catalyst with controlled acidity, characterized in that the level of activity of said catalyst in isomerization of the cyclohexane is less than 0.10 and/or in that the ratio of toluene hydrogenation activity to the cyclohexane isomerization activity is greater than 10.

14 Claims, No Drawings

PROCESS FOR CONVERSION OF HYDROCARBONS ON A CATALYST WITH CONTROLLED ACIDITY

CROSS REFERENCE TO RELATED APPLICATION

This application claims the benefit of U.S. Provisional Application No. 60/186,300 filed Mar. 1, 2000.

It is known that the catalysts for conversion of hydrocarbons and in particular for hydrotreatment of residues are deactivated by metal deposits, such as vanadium sulfide and nickel sulfide, and by coke deposits. It is also known that coke deposits are increased when the acidity of the catalyst increases.

The applicant discovered, surprisingly, that the use of catalysts of controlled acidity and/or the monitoring of the concatenation of the catalysts to use the most acidic catalyst second leads to quite better performance levels. The invention therefore relates to a process for hydrocarbon conversion, for example, hydrotreatment, and more particularly hydrodesulfurization of residues that were previously partially demetallized, consisting in moving a partially demetallized residue onto at least one catalyst of controlled acidity.

These catalysts are characterized in that their acidity is limited and/or that the ratio between their performance level in a hydrogenation reaction is to a large extent greater than their performance level in an acidity test reaction. In the case where two catalysts that have controlled, but different acidity are used in one or more reactors, it is recommended to concatenate them in the following way:

- if a single one of the two catalysts contains cobalt, it is preferable to position the latter upstream from the second catalyst that does not contain cobalt,
- if both or neither of the two contain cobalt, it is preferable to use as a second the more acidic catalyst or the catalyst with the smallest hydrogenation/acidity ratio.

The acidity and the performance level of hydrogenation are evaluated by a catalytic test of a mixture of model molecules: the hydrogenation of toluene and the isomerization of cyclohexane. According to this test that is described below and under these measuring conditions, the level of activity in isomerization of cyclohexane should be limited to 0.10 and/or the ratio of hydrogenating activity/isomerizing activity should be greater than 10.

The catalytic test that makes it possible to monitor the acidity of the catalysts is carried out according to the following operating procedure:

The catalysts are sulfurized in situ under dynamic conditions in the tubular traversed fixed-bed reactor of a catatest-type pilot unit (manufacturer Vinci Technologies), whereby the fluids circulate from top to bottom. The hydrogenating and isomerizing activities are measured immediately after the pressurized sulfurization without reexposure to air with the hydrocarbon feedstock that was used to sulfurize the catalysts.

The sulfurization and test feedstock consists of 5.8% dimethyl disulfide (DMDS), 20% toluene and 74.2% cyclohexane by weight. The stabilized catalytic activities of equal volumes of catalysts thus are measured in the hydrogenation reaction of the toluene. The follow-up to the isomerization of the cyclohexane, diluting toluene, makes it possible to estimate the acidity of the catalysts.

The conditions for measuring activity are as follows (taking into consideration total vaporization and the ideal gas law):

| | |
|---|---|
| Total pressure: | 6.0 MPa |
| Toluene pressure: | 0.38 MPa |
| Cyclohexane pressure: | 1.55 MPa |
| Hydrogen pressure: | 3.64 MPa |
| $H_2S$ pressure: | 0.22 MPa |
| Catalyst volume: | 40 cc |
| Feedstock flow rate: | 80 cc/h |
| Hourly volumetric flow rate: | 2 l/l/h$^{-1}$ |
| Hydrogen flow rate: | 36 l/h |
| Sulfurization and test temperature | 350° C. (3° C./min) |

Sampling of the liquid effluent is analyzed by gas phase chromatography. The determination of molar concentrations in unconverted toluene (T) and concentrations of hydrogenation products: methyl cyclohexane (MCC6), ethyl cyclopentane (EtCC5) and dimethyl cyclopentane (DMCC5) make it possible to calculate a hydrogenation rate of toluene $X_{HYD}$ defined by:

$$X_{HYD}(\%)=100 * (MCC6+EtCC5+DMCC5)/(T+MCC6+EtCC5+DMCC5)$$

The cyclohexane isomerization rate $X_{ISO}$ is calculated in the same way from concentrations of unconverted cyclohexane and its reaction product, methyl cyclopentane. Whereby the hydrogenation reaction of toluene and isomerization of the cyclohexane are first order reaction under our test conditions, and the reactor acts like an ideal piston reactor, hydrogenating activity $A_{HYD}$ and isomerizing activity $A_{ISO}$ of the catalysts are calculated by applying the formula:

$$Ai=\ln(100/(100-X_i)).$$

The ratio of hydrogenating activity to isomerizing activity H/A is equal to $A_{HYD}/A_{ISO}$.

The hydrodesulfurization processes of this invention can be applied to, for example, petroleum fractions such as the crude petroleums of degree API that are less than 20, the extracts of asphaltic sands and oil shales, atmospheric residues, vacuum residues, asphalts, deasphalted oils, deasphalted vacuum residues, deasphalted crudes, heavy fuels, atmospheric distillates and vacuum distillates or else with hydrocarbons other than the carbon liquefiers.

The hydrorefining and hydroconversion reactions of these hydrocarbon feedstocks (hydrotreatments) can be carried out in a reactor that contains the catalyst that is arranged in a fixed bed. Another application of the invention is the use of these same catalysts in an effervescent bed, particularly within the framework of hydrotreatments.

In the fixed-bed or effervescent-bed processes, the hydrotreatments that are intended to eliminate the impurities such as sulfur, nitrogen, and metals and to lower the mean boiling point of these hydrocarbons are usually used at a temperature of about 320 to about 470° C., preferably about 350 to 450° C., under a partial hydrogen pressure of about 3 MPa (mega Pascal) to about 30 MPa, preferably 5 to 20 MPa, at a volumetric flow rate of about 0.1 to about 6 volumes of feedstock per volume of catalyst and per hour, preferably 0.2 to 2 volumes per volume of catalyst and per hour, whereby the ratio of gaseous hydrogen to liquid hydrocarbon feedstock is between 100 and 5000 normal cubic meters per cubic meter ($Nm^3/m^3$), preferably between 200 and 1500 ($Nm^3/m^3$).

The catalysts of this invention generally have the following composition:

- at least one metal of group VIB: 5 and 40% by weight of oxide, preferably molybdenum or tungsten, at least one metal of group VIII: 0.1 to 10% by weight of oxide, preferably iron, cobalt and nickel, at least one porous oxide substrate such as aluminas or silica-aluminas. It is preferred to use substrates that contain alumina: 40 to 94.6% by weight of an oxide substrate relative to the total mass of the catalyst, optionally at least one dopant that is selected from the group that consists of phosphorus, boron, silicon and halogens; 0 to 10% by weight overall of $P_2O_5$, $SiO_2$, $B_2O_3$, and/or halogens.

The catalysts according to the invention can be prepared by any suitable methods, in particular by the methods that are described in French Patents No. 97/07149, 87/09 359, 96/15 622 or else 96/13 797. As an example and without limiting the scope, the first catalyst, which can be of NiCoMo type without a dopant, can be prepared by impregnation of an alumina by an aqueous solution that contains a molybdenum precursor, a cobalt precursor and a nickel precursor. The second catalyst, which can be of NiMoP type, can be prepared, as an example, by co-impregnation of an alumina by an aqueous solution that contains a molybdenum precursor, a nickel precursor and a phosphorus precursor.

The optional metals and dopants can be introduced at any moment of the preparation, in particular by impregnation on a substrate that is already formed or introduced during the synthesis of the substrate.

The catalysts that are described in this invention are shaped in the form of grains of different shapes and sizes. They are used in general in the form of cylindrical extrudates or multilobar extrudates, such as bilobar, trilobar, or multi-lobar extrudates of straight or twisted shape, but they can optionally be produced and used in the form of crushed powder, tablets, rings, balls, wheels. They have a specific surface area that is measured by nitrogen adsorption according to the BET method (Brunauer, Emmett, Teller, J. Am. Chem. Soc., Vol. 60, 309–316 (1938) between 50 and 600 $m^2/g$, a pore volume that is measured by mercury porosimetry between 0.2 and 1.5 cm/g and a distribution of pore size that can be monomodal, bimodal or polymodal.

The catalysts of this invention are preferably subjected to a sulfurization treatment that makes it possible to transform, at least in part, the metallic sulfide radicals before they are brought into contact with the feedstock that is to be treated. This activation treatment by sulfurization is well known to one skilled in the art and can be carried out for any method that is already described in the literature.

A standard sulfurization method that is well known to one skilled in the art consists in heating the mixture of solids under the flow of a hydrogen and hydrogen sulfide mixture or under the flow of a nitrogen and hydrogen sulfide mixture at a temperature of between 150 and 800° C., preferably between 250 and 600° C., generally in a flushed-bed reaction zone.

The applicant discovered, surprisingly enough, that the treatment of a hydrocarbon feedstock of distillation residue type, previously partially demetallized, which circulates in at least one catalyst of controlled acidity or successively in at least two catalysts of increasing acidity or a decreasing hydrogen/acidity ratio, provided better performance levels in hydrodesulfurization (HDS), hydrodenitrating (HDN) and hydrodecarbonation (HDCCR) with a weaker deactivation and therefore a better service life than the use of a single catalyst of uncontrolled acidity.

The examples below illustrate the invention described without, however, limiting its scope:

EXAMPLE 1

Preparation of the Alumina Substrate That is Part of the Composition of the Catalysts of the Invention We manufactured a substrate based on alumina in a large quantity to be able to prepare the catalysts that are described below from the same shaped substrate. To do this, we used a matrix that consists of ultrafine tabular boehmite or alumina gel that is marketed under the name SB3 by the Condéa Chemie GmbH Company. This gel was mixed with an aqueous solution that contains nitric acid at 66% (7% by weight of acid per gram of dry gel), then mixed for 15 minutes. At the end of this mixing, the paste that is obtained is passed through a die that has cylindrical orifices of a diameter that is equal to 1.3 mm. The extrudates are then dried for one night at 120° C. and then calcined at 550° C. for 2 hours under moist air that contains 75% by volume of water. Cylindrical extrudates are thus obtained that have a 1.2 mm diameter, a specific surface area of 243 $m^2/g$, a pore volume of 0.61 $cm^3/g$ and a monomodal pore size distribution that is centered on 100 Å. The analysis of the matrix by x-ray diffraction proves that the latter consists only of cubic gamma alumina of low crystallinity.

EXAMPLE 2

Preparation of Catalyst A (NiCoMo/$Al_2O_3$) According to the Invention

We impregnated in the dry state the extruded substrate of Example 1 by an aqueous solution that contains molybdenum salts, cobalt salts and nickel salts. The molybdenum salt is ammonium heptamolybdate $Mo_7O_{24}(NH_4)_6 \cdot 4H_2O$, the cobalt salt is cobalt nitrate $Co(NO_3)_2 \cdot 6H_2O$, and the nickel salt is nickel nitrate $Ni(NO_3)_2 \cdot 6H_2O$. After maturation at ambient temperature in a water-saturated atmosphere, the impregnated extrudates are dried for one night at 120° C. then calcined at 500° C. for 2 hours under dry air. The final content of molybdenum trioxide is 14.5% by weight of the finished catalyst. The final content of cobalt oxide CoO is 2.4% by weight of the finished catalyst. The final content of nickel oxide NiO is 0.8% by weight of catalyst. Catalyst A that is thus obtained is representative of a catalyst according to this invention (see Example 6).

EXAMPLE 3

Preparation of Catalyst B (NiMoP/alumina) According to the Invention

We impregnated in the dry state the extruded substrate of Example 1 by an aqueous solution that contains ammonium heptamolybdate $Mo_7O_{24}(NH_4)_6 \cdot 4H_2O$ and nickel nitrate $Ni(NO_3)_2 \cdot 6H_2O$ to which phosphoric acid $H_3PO_4$ was added. The same stages of maturation, drying and calcination as for the preparation of catalyst A of Example 2 were used. The final content of molybdenum trioxide is 16.0% by weight of the finished catalyst. The final content of nickel oxide is 4.0% by weight of the finished catalyst. The final content of phosphorus, expressed in pentaoxide, is 6% by weight of the finished catalyst. Catalyst B that is thus obtained is representative of a catalyst according to this invention (see Example 6).

EXAMPLE 4

Preparation of a Catalyst C (NiMoSi/alumina) According to the Invention

We impregnated in the dry state the extruded substrate of Example 1 by an aqueous solution that contains ammonium heptamolybdate $Mo_7O_{24}(NH_4)_6 \cdot 4H_2O$ and nickel nitrate (Ni$(NO_3)_2 \cdot 6H_2O$. The stages of maturation, drying and calcination, as for the preparation of catalyst A of Example 2, were used. This precursor NiMo that was thus obtained was again impregnated, but this time by an aqueous solution that contains the Rhodorsil silicone emulsion EP1. The final content of molybdenum trioxide is 14.0% by weight of the finished catalyst. The final content of nickel oxide is 3.4% by weight of the finished catalyst. The final content of silicon, expressed in $SiO_2$, is 1.8% of the weight of the finished catalyst.

Catalyst C that is thus obtained is representative of a catalyst according to this invention (see Example 6).

EXAMPLE 5

Preparation of a Catalyst D (NiMoPSi/alumina) Not According to the Invention We impregnated in the dry state the extruded substrate of Example 1 by an aqueous solution that contains ammonium heptamolybdate $Mo_7O_{24}(NH_4)_6 \cdot 4H_2O$ and nickel nitrate $Ni(NO_3)_2 \cdot 6H_2O$ to which phosphoric acid $H_3PO_4$ is added. The same stages of maturation, drying and calcination as for the preparation of catalyst A of Example 2 were used. This precursor NiMoP that was thus obtained was again impregnated, but this time by an aqueous solution that contains the Rhodorsil silicone emulsion EP1. The final content of molybdenum trioxide is 16.0% by weight of the finished catalyst. The final content of nickel oxide is 4% by weight of the finished catalyst. The final content in phosphorus, expressed in pentaoxide, is 6% by weight of the finished catalyst. The final content of silicon, expressed in $SiO_2$, is 4% by weight of the finished catalyst. Catalyst D that was thus obtained is not in accordance with the invention (see Example 6).

EXAMPLE 6

Hydrogenation and Acidity Tests on Model Molecules

Hydrogenation of Toluene, Isomerization of Cyclohexane

Catalysts A to D, described above, are sulfurized in situ under dynamic conditions in the tubular fixed-bed reactor that is traversed by a catatest-type pilot unit (manufacturer Vinci Technologies), whereby the fluids circulate from top to bottom. The measurements of hydrogenating and isomerizing activity are made immediately after the pressurized sulfurization without reexposure to air with the hydrocarbon feedstock that was used to sulfurize the catalysts.

The sulfurization and test feedstock consists of 5.8% by weight of dimethyl disulfide (DMDS), 20% by weight of toluene and 74.2% by weight of cyclohexane. The stabilized catalytic activities of equal volumes of catalysts A to D thus are measured in the hydrogenation reaction of toluene. The follow-up of the isomerization of the cyclohexane, which dilutes toluene, makes it possible to estimate the acidity of the catalysts.

The conditions for activity measurement (based on a total vaporization and the ideal gas law) are as follows:

| | |
|---|---|
| Total pressure: | 6.0 MPa |
| Toluene pressure: | 0.38 MPa |
| Cyclohexane pressure: | 1.55 MPa |
| Hydrogen pressure: | 3.64 MPa |
| $H_2S$ pressure: | 0.22 MPa |
| Catalyst volume: | 40 cc |

-continued

| | |
|---|---|
| Feedstock flow rate: | 80 cc/h |
| Hourly volumetric flow rate: | 2 l/l/h$^{-1}$ |
| Hydrogen flow rate: | 36 l/h |
| Sulfurization and test temperature | 350° C. (3° C./min). |

Samplings of the liquid effluent are analyzed by gas phase chromatography. The determination of molar concentrations in unconverted toluene (T) and concentrations of the hydrogenation products: methyl cyclohexane (MCC6), ethyl cyclopentane (EtCC5) and dimethyl cyclopentane (DMCC5) make it possible to calculate a toluene hydrogenation rate $X_{HYD}$ that is defined by:

$$X_{HYD} (\%) = 100 * (MCC6+EtCC5+DMCC5)/(T+MCC6+EtCC5+DMCC5)$$

The isomerization rate of cyclohexane $X_{ISO}$ is calculated in the same way from concentrations of unconverted cyclohexane and its reaction product, methyl cyclopentane.

Whereby the hydrogenation reaction of toluene and isomerization of the cyclohexane were of the first order under our test conditions, and the reactor acts as an ideal piston reactor, hydrogenating activity $A_{HYD}$ and isomerizing activity $A_{ISO}$ of the catalysts are calculated by applying the formula:

$$Ai = ln(100/(100-X_i)).$$

Table 1 compares the hydrogenating and isomerizing activities of different catalysts, as well as the H/A ratio that is defined by the $A_{HYD}/A_{ISO}$ ratio between the hydrogenating activity and the isomerizing activity.

TABLE 1

Hydrogenating and Isomerizing Activities of Catalysts A to D

| Catalyst | Formula | $A_{HYD}$ | $A_{ISO}$ | $A_{HYD}/A_{ISO}$ |
|---|---|---|---|---|
| A | NiCoMo/alumina | 0.50 | 0.005 | 100 |
| B | NiMoP/alumina | 0.65 | 0.009 | 72 |
| C | NiMoSi/alumina | 0.78 | 0.011 | 71 |
| D | NiMoPSi/alumina | 0.60 | 0.078 | 7 |

Table 1 shows that catalysts A to C are in accordance with the first aspect of the invention, since the isomerization activity is, under these measuring conditions, less than 0.10, and that the ratio between the hydrogenating activity and the isomerizing activity, $A_{HYD}/A_{ISO}$ is greater than 10. On the contrary, catalyst D is not in accordance with the invention, since the ratio between the hydrogenating activity and the isomerizing activity is less than 10.

EXAMPLE 7

Pilot Tests Evaluating the HDT Performance of Petroleum Distillation Residues of Catalysts A to D Catalysts A and D have been evaluated in themselves or concatenated in a hydrotreatment pilot test of a vacuum distillation residue of Light Arabian origin, previously partially demetallized. This feedstock was previously demetallized in a fixed-bed pilot unit by a hydrotreatment catalyst, such as the one that is described in, for example, French Patent No. 97/07149.

The main characteristics of this demetallized residue are posted in Table 2 below:

TABLE 2

Characteristics of previously partially demetallized vacuum residues

|  | Demetallized vacuum residue |
|---|---|
| Density 15/4 | 0.989 |
| Sulfur (% by weight) | 2.3 |
| Ni (ppm by weight) | 12 |
| V (ppm by weight) | 18 |
| Asphaltenes C7 (% by weight) | 3.9 |
| Cnradson carbon (% by weight) | 14 |
| N (ppm by weight) | 3600 |

This feedstock is treated on a hydrotreatment pilot unit of petroleum residues comprising two tubular fixed-bed reactors arranged in series. Each reactor can be filled with 1 liter of catalyst. The flow of fluids (petroleum+hydrogen residues) is upward in the reactor.

When each catalyst is evaluated by itself, only the first reactor is loaded with a liter of catalyst. When it is desired to evaluate the concatenation of catalysts, the first catalyst is loaded into the first reactor and the second into the second reactor. In all cases, the flow rates of residues and of hydrogen gas are adjusted to keep constant the hourly volumetric flow rate of the residue and the ratio between the gas flow rate and the liquid flow rate (Table 3).

After a sulfurization stage by circulation in the reactors of a vacuum distillate fraction that contains 2% by weight of sulfur at a final temperature of 350° C., the unit is operated with the partially demetallized vacuum residue that is described above. The operating conditions that are used at the beginning of the test are as follows:

TABLE 3

Operating Conditions of Pilot Tests

| Total pressure | 150 MPa |
|---|---|
| Temperature at the beginning of the cycle | 370° C. |
| Hourly volumetric flow rate of the residue | 0.3 h$^{-1}$ |
| Hydrogen recycling | 1000 hours at 1 H$_2$/l of feedstock |

After 500 hours of stabilization under these conditions, the performance levels of hydrodesulfurization (HDS), hydrodemetallization (HDM), Conradson carbon reduction (HDCCR) and hydrodenitration (HDN) are measured and calculated in the following way:

HDS (% by weight)=((% by weight of S)feedstock−(% by weight of S)formula/% by weight of S feedstock*100

HDM (% by weight)=((ppm by weight of Ni+V) feedstock−(ppm by weight of Ni+V)formula)/ppm by weight of Ni+V feedstock*100

HDCCR (% by weight)=((% by weight of CCR) feedstock−(% by weight of CCR)formula)/% by weight of CCR feedstock*100

HDN (% by weight)=(ppm by weight of N)feedstock− (ppm by weight of N)formula)/ppm by weight of N feedstock*100

The performance levels that are obtained at the end of 500 hours in the catalysts are as follows (Table 4):

TABLE 4

Performance Levels at the End of 500 Hours at 370° C.

| Catalytic System | HDS (% by weight) | HDM (% by weight) | HDCCR (% by weight) | HDN (% by weight) |
|---|---|---|---|---|
| Catalyst A | 75.1 | 51 | 38 | 38.3 |
| Catalyst B | 74.5 | 49.3 | 38.5 | 39 |
| Catalyst C | 78.0 | 53.1 | 39.5 | 39.2 |
| Catalyst D | 73.5 | 51 | 35.5 | 38.5 |
| Catalyst A + B | 75.0 | 50.2 | 38.9 | 38.6 |
| Catalyst A + C | 76.5 | 52.1 | 39.0 | 38.2 |
| Catalyst C + A | 75.5 | 51.8 | 38.5 | 39.0 |

After this period of 500 hours, the tests are conducted by aiming at keeping a constant HDS rate of 78% by weight throughout the cycle. The purpose of this is to evaluate the relative stability of the different catalysts or combination of catalysts. For this purpose, the deactivation of the catalyst in HDS is compensated by a gradual increase of the reaction temperature.

After a total operating time of 2500 hours, the temperatures of the reactors and the performance levels that are obtained are as follows (Table 5):

TABLE 5

Performance Levels at the End of 2500 Hours

| Catalytic system | Temperature (° C.) | HDS (% by weight) | HDM (% by weight) | HDCCR (% by weight) | HDN (% by weight) |
|---|---|---|---|---|---|
| Catalyst A | 392 | 78 | 55.1 | 40.5 | 39.2 |
| Catalyst B | 394 | 78 | 52.5 | 41.9 | 40.1 |
| Catalyst C | 390 | 78 | 55.6 | 42.8 | 40.1 |
| Catalyst D | 400 | 78 | 53.1 | 36.5 | 37.2 |
| Catalyst A + B | 389 | 78 | 53.9 | 45.1 | 42.1 |
| Catalyst A + C | 386 | 78 | 53.8 | 45.0 | 41.5 |
| Catalyst C + A | 391 | 78 | 55.3 | 41.5 | 39.9 |

It appears that catalysts A, B or C that meet the criteria of acidity defined in this patent are initially more active in refining, primarily HDS; this is not the case of catalyst D whose hydrogenation/acidity balance does not meet the criteria of the invention. This advantage is also observed with still more significant deviations, after 2500 hours of operation, reflecting a greater stability over time of the catalysts that meet this criterion.

The advantage (second aspect of the invention) of circulating the feedstock in at least two catalysts of growing acidity (increasing A and/or decreasing H/A) is primarily visible at the stability level: it is observed that the A+B or A+C combinations are more high-performing after 2500 hours of operation than the catalysts that are used by themselves, and considerably more high-performing than a single catalyst, used by itself and not meeting the criteria of the invention. These observations have been made with regard to both HDS and to the HDCCR and HDN rates. This leads to a better potential of hydrotreated product as a feedstock of a catalytic cracking unit.

Putting the most acid catalyst first (case C+A) leads to a lower initial performance level and a lower stability of this performance level relative to those of the system that puts the least acid catalyst first (case A+C) as is described in the invention.

On the contrary, in the case where the feedstock is circulated on a catalyst that has a high acidity or a low hydrogenation/acidity balance (catalyst D), it appears necessary to very strongly increase the temperature (400° C.) to keep an HDS rate of 78%. This type of catalyst thus leads to neither a high performance level at the beginning of the cycle nor stability that is compatible with a satisfactory cycle length.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application number 00/02.284 filed Feb. 23, 2000 and U.S. Provisional Application No. 60/186,300 filed Mar. 1, 2000, are hereby incorporated by reference in their entirety.

From the foregoing description, one skilled in the art can easily ascertain the essential characteristics of this invention, and can make various changes and modifications of the invention to adapt it to various usages and conditions.

Also, the term "effervescent" can be replaced by "bubbling" which may be a more common term in connection with catalytic beds.

What is claimed is:

1. A process comprising hydrotreating a hydrocarbon feedstock in the presence of at least one catalyst of controlled acidity, wherein the level of activity of said catalyst in isomerization is less than 0.10 and the ratio of hydrogenating activity to isomerizing activity is greater than 10, said process further comprising passing said hydrocarbon feedstock through a first catalyst bed and a second catalyst bed, each of said catalyst beds containing said at least one catalyst of controlled acidity, wherein said at least one catalyst of controlled acidity containing cobalt, and the catalyst in the first catalyst bed, in the direction of flow, has a greater ratio of activities than the catalyst in the second bed.

2. A process according to claim 1, applied to the hydrodesulfurization of a hydrocarbon feedstock.

3. A process according to claim 1, wherein said process is carried out in at least one fixed-bed reactor.

4. A process according to claim 1, wherein said process is carried out in at least one effervescent-bed reactor.

5. A process according to claim 1, wherein the catalyst is sulfurized and further comprising evaluating the acidity and comparative isomerization and hydrogenation activities of the catalyst after sulfurization of the catalyst.

6. A process according to claim 5, wherein the isomerizing activity and the hydrogenation activity are evaluated by a catalytic test of a mixture of model molecules consisting of 5.8% dimethyldisulfide, 20% toluene and 74.2% cyclohexane by weight, under the following conditions:

Total pressure: 6 MPa
Toluene pressure: 0.38 MPa
Cyclohexane pressure: 1.55 MPa
Hydrogen pressure: 3.64 MPa
H2S pressure: 0.22 MPa
Catalyst volume: 40 cm3
Feedstock flow rate: 80 cc/h
Hourly volumetric flow rate: 80 cc/h
Hydrogen flow rate: 36 l/h
Sulfurization and test temperature: 350° C.(3° C./min)

wherein the determination of molar concentrations in unconverted toluene (T) and concentrations of the hydrogenation products: methylcyclohexane (MCC6), ethylcyclopentane (EtCC5) and dimethyl cyclopentane (DMCC5), whereby a toluene hydrogenation rate Xhyd that is defined by $$XHYD(\%) = 100*(MCC6+EtCC5+DMCC5)/(T+MCC6+EtCC5+DMCC5)$$

and an isomerization rate of cyclohexane XISO which is determined analogously from concentrations of unconverted cyclohexane and its reaction product, methyl cyclopentane hydrogenating activity AHYD, whereby isomerizing activity AISO of the catalysts is provided by applying the formula:

$$Ai = ln(100/(100-Xi)).$$

7. A process according to claim 1, wherein the hydrocarbon feedstock is petroleum distillation residue.

8. A process according to claim 1, wherein the hydrocarbon feedstock is partially demetallized vacuum residue.

9. A process according to claim 1, wherein the catalyst comprises support and VIB and VIII metals.

10. A process comprising hydrotreating a hydrocarbon feedstock in the presence of at least one catalyst of controlled acidity, wherein the level of activity of said catalyst in isomerization is less than 0.10 and the ratio of hydrogenating activity to isomerizing activity is greater than 10, said process further comprising passing said hydrocarbon feedstock through two successive beds of catalysts, each bed containing said at least one catalyst of controlled acidity and in the direction of flow, and the catalyst in the first bed having a lower acidity than the catalyst in the second bed, with the further provision that neither catalyst contains cobalt.

11. A process according to claim 10 wherein said catalyst comprises a combination of metals consisting essentially of molybdenum, nickel and silicon.

12. A process comprising hydrotreating a hydrocarbon feedstock in the presence of at least one catalyst of controlled acidity, wherein the level of activity of said catalyst in isomerization is less than 0.10 and the ratio of hydrogenating activity to isomerizing activity is greater than 10, said process further comprising passing said hydrocarbon feedstock through two successive beds of catalysts, each bed containing said at least one catalyst of controlled acidity and in the direction of flow, the catalyst in the first bed having a greater ratio of activities than the catalyst in the second bed, with the further provision that neither catalyst contains cobalt.

13. A process comprising hydrotreating a hydrocarbon feedstock in the presence of at least one catalyst of controlled acidity, wherein the level of activity of said catalyst in isomerization is less than 0.10 and the ratio of hydrogenating activity to isomerizing activity is greater than 10, said process further comprising passing said hydrocarbon feedstock through two successive beds of catalysts, each bed containing said at least one catalyst of controlled acidity and in the direction of flow, and the catalyst in the first bed having a lower acidity than the catalyst in the second bed, with the further provision that both of said catalysts are based on identical catalyst supports.

14. A process comprising hydrotreating a hydrocarbon feedstock in the presence of at least one catalyst of controlled acidity, wherein the level of activity of said catalyst in isomerization is less than 0.10 and the ratio of hydrogenating activity to isomerizing activity is greater than 10, wherein said catalyst of controlled acidity does not contain cobalt, and further comprising hydrotreating said hydrocarbon feedstock in an upstream catalyst bed wherein the catalyst comprises alumina supporting a combination of molybdenum, cobalt and nickel metals, and the catalyst of controlled acidity comprises alumina supporting a combination of molybdenum, nickel and silicon.

* * * * *